Figure 1:
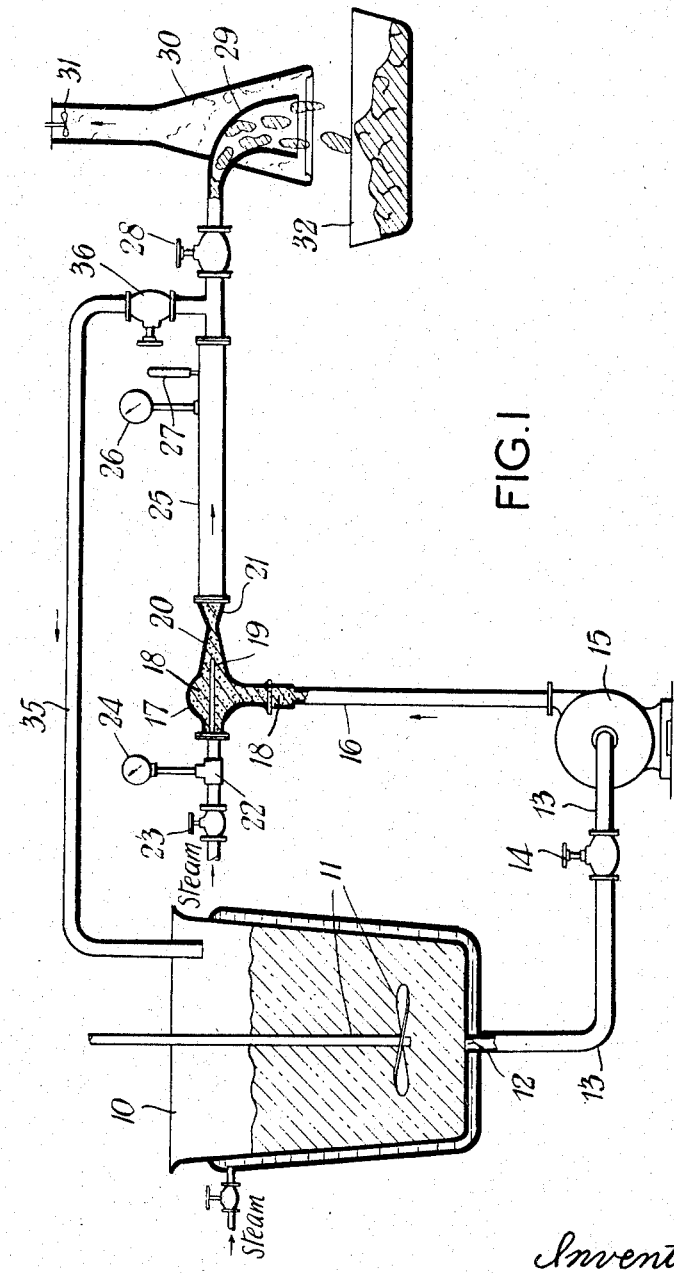

March 19, 1968 H. KNOCH 3,374,096
CONTINUOUS PROCESS FOR COOKING GELATINOUS OR GELATINIZABLE
SUBSTANCES, FIBROUS MATTERS AND THE LIKE
Filed July 5, 1963 2 Sheets-Sheet 1

Inventor
Hans Knoch
by Sommers + Young
Attorneys

United States Patent Office 3,374,096
Patented Mar. 19, 1968

3,374,096
**CONTINUOUS PROCESS FOR COOKING GELATI-
NOUS OR GELATINIZABLE SUBSTANCES, FI-
BROUS MATTERS AND THE LIKE**
Hans Knoch, 19 Ashbourne Road, Ealing,
London W. 5, England
Filed July 5, 1963, Ser. No. 293,026
Claims priority, application Great Britain,
Aug. 13, 1962, 30,887/62
1 Claim. (Cl. 99—1)

This invention concerns improvements relating to continuous cooking of gelatinous substances, gelatinisable substances, fibrous matters and the like all being material containing starch or other extractable gel-forming matter.

In the preparation of confectionery liquorice, confectionery or medicated pastilles, fruit jellies and similar products it is customary to mix a sugar solution with flour or starches (such as wheat starch, maize starch, potato starch, tapioca starch, etc.) and other usual ingredients, and to heat the mixture in a jacketed vessel to a temperature above the starch gelatinization temperature, usually some 60–70° C. (140–160° F.), until the starch granules swell, gelatinize, burst and form a colloidal solution. Thereafter, the mix may be further heated at an elevated temperature in order to evaporate surplus moisture and to reach the desired consistency and viscosity suitable for further treatment such as shaping the product by means of extrusion, moulding by depositing it in prepared starch moulds, rolling it into sheets by a set of rollers or any other suitable procedure and finally drying the product to the required moisture content.

In the case of extracting juices from roots, tubers and other fibrous matters, the latter in chipped condition are usually mixed with a liberal amount of water which is caused to percolate, or is circulated in, the product, sometimes under pressure, for many hours in or through a series of extracting vessels in order to draw extractable elements from the fibrous matters and to suspend same in the water. Starch extracted in this manner remains in suspension in the water and is not gelatinised but has to be gelatinised in a separate process after filtration of the liquid. The liquid containing the gelatinised starch and other extracted matter may then be heated in vacuo or heated to dryness so that the total solids are gained in paste or solid form respectively.

These methods have the disadvantage that they are expensive, slow, inefficient and irregular. The degree of gelatinsation of the starch may vary from batch to batch, and it may influence taste or flavour, yield and consistency. Fruit jellies lack the desired brilliance and clarity. Much manual work and skill are needed for the operation.

An object of the present invention is to provide, in place of the long cooking, gelatinisation and/or extracting process in batches, a continuous process enabling a more complete and uniform gelatinisation, or extraction at reduced pressures, to be obtained together with higher efficiency and yield, improved flavour and taste or consistency, and reduction of manual and skilled labour.

Improved results have already been obtained by the use of the process and apparatus described in the United States patent specification No. 2,805,966 and wherein steam of some 100 lbs. pressure was blown radially outwards into a tubular space of some 12″ diameter through which a starch slurry was passed in a continuous stream by means of a high pressure pump. However, although during its passage through the tubular space, the starch becomes gelatinised, this gelatinisation was found to be incomplete and somewhat lacking in uniformity, because the volume of slurry in the tubular space was too large so that the steam, even at 100 lbs. pressure, was not capable of penetrating through the stream of slurry and attack and gelatinise each starch particle sufficiently and regularly. Tests carried out with the view of adapting the process and apparatus to the treatment of heavy slurries for extraction of liquorice have been found to fail completely.

A desirable degree of success has also been obtained from the process and apparatus described in the United Kingdom patent specification No. 883,440 particularly when using a steam jet as the medium for conveying and heating the mixture treated. However, the results have proved somewhat irregular, and it has not always been possible to attain complete gelatinisation, due to the fact that the steam jet could not effectively combine in its action the two functions of conveying and heating the mixture. On the contrary, these functions have proved too dependent on each other; for instance if it were desired to speed up the flow of the mixture or slurry it proved necessary to apply more working steam which in turn overheated the slurry, or vice versâ.

Further researches have now shown that it is possible to obtain a more complete and regular and quicker gelatinisation or extraction, if the volume to be treated at any one time is substantially reduced, if the liquid is atomised under vacuum thereby giving the total solids an opportunity to expand or dilate, and if at this stage the liquid is exposed to a blast of hot gaseous medium, particularly steam.

According to the present invention, a process of treatment of gelatinous, gelatinisable fibrous and similar products, all being materials containing starch or other extractable gel-forming matter, comprises mixing such a product with an aqueous medium to render it flowable, continuously subjecting the mixture thus obtained to linear flow, setting up a region of the flow conditions resulting in expansion of the individual particles of solids of the mixture substantially throughout that region, controlling said flow in a manner continuously to maintain said conditions in that particular region, and in a subsequent region of said flow applying in a continuous manner to the expanded particles from the first-mentioned region a blast of hot gaseous medium.

By this process, it is possible to obtain a very rapid and highly uniform gelatinisation of starch or other gel-forming matter present in gelatinous and gelatinisable materials and, in the case of fibrous matter, a similarly rapid and uniform extraction of useful solid particles including starch, sugars, gums, or other particles which undergo like gelatinisation.

The invention is not restricted to cases where the gel is obtained by starch because in appropriate instances, for example in the manufacture of confectionery and medicated jellies, the gel can be attained by gelatine, agar-agar, pectines, gums and so on produced according to the process of the invention from the respective raw products.

The aqueous medium used in the preparation of the initial mixture is in most cases advantageously water. However, certain additions may be made to water to provide desirable aqueous media as is belived will be understood. The most appropriate hot gaseous medium for use in the blast treatment is steam applied in the form of a jet operating at relatively high speed and/or pressure but here again variations are possible.

It will be realised that the principle underlying the invention is to make the motive power for linearly flowing the mixture and the heating of the expanded solid particles substantially independent of each other. Hitherto, as above indicated, a jet of steam has been used as an aggregate both to flow and to heat the mixture. By the present invention, once the linear flow of the mixture has been established, and seeing that such flow is maintained, the effect of the blast or jet of gaseous medium is to set up and hold a suction condition in the first-mentioned region of the flow in which the mixture is atomised and its solid particles are thus able individually to expand with the advantage that they are favourably pre-conditioned for the heating action of the blast or jet. Important aspects to note are that suction action creates opening, expansion or atomisation of the slurry prior to the heat-treatment, and that, as the latter treatment is continuous, the blast of hot gaseous medium, operating on atomised or expanded slurry, causes a very high turbulence of the slurry particles during the heat treatment.

The blast or jet of hot gaseous medium may be applied through a venturi formation in the line of flow to impart localised increase of speed to the flowing mixture and assist in the vacuum action.

Moreover, the time during which the heat of the blast or jet is applied can be extended by arranging for the subsequent region aforesaid of the flow to comprise a pressure region, e.g. beyond the venturi formation, should further gelatinisation or extraction be required. In this manner the process, as above mainly completed, can be intensified by exposing the pre-treated mixture for a further short space of time (seconds), and while still under flow, to pressure and an elevated temperature suitably above boiling point, when a full gelatinisation or extraction can be obtained as is desirable in some cases, for instance when preparing fruit jellies.

On subsequently releasing the mixture from pressure it will give off surplus moisture in the form of vapour and provide a completed product suitable for use as such or after further treatment or packaging.

According to another feature of the invention, a plant appropriate for use in putting the process of the invention into effect, comprises a flow line for a gelatinous gelatinisable, fibrous or like product mixed with substantially the minimum quantity of aqueous medium to render it flowable, a pump arranged in the line and controllable for setting up and maintaining flow of the mixture in the flow line, and a jet device for hot gaseous medium arranged in said line forward of said pump, said jet device being disposed in such relation to a suction chamber disposed in the line forward of said pump that said jet device is operative on the flow in said line in a manner to expand the individual particles of said product in said chamber and thereafter deliver them from the chamber and subject them to a blast of the hot gaseous medium.

The initial mixing of the product with water to provide the mixture for the flow line may suitably be effected in a steam jacketed mixing vessel fitted with an agitator and having an outlet to the flow line at the bottom.

The pump used in the flow line may be of centrifugal or other type sufficiently powerful for moving heavy mixes. It can be controlled by a suitable regulating valve on its inlet side.

For extended treatment of the product, the apparatus of the invention may further have the flow line continued forwardly from the jet device in the form of a pressure tube having a regulating valve at its far end for control of the pressure and temperature of the flow and consistency of the mixture.

A venturi device may be disposed in the flow line in association with the jet device to increase the velocity of the mix locally. One effect of this is that the speed of flow at the delivery end of the flow line can be maintained substantially equal to that of the delivery at the pump.

The apparatus may in some cases comprise at the delivery end of the flow line, and beyond a regulating valve adjacent that end, open-ended discharge duct or tube arranged at an angle, suitably a right-angle, to the flow line, so that the treated mix can discharge at the lower end, and vapour can escape from the mix at the upper end, of such duct or tube. Or the delivery end of the flow may terminate in a flaring form surrounded by a vapour hood through which the freed and escaping vapour is sucked away. As an alternative for use in extracting fibrous matters and the like, a return line leading from before the said regulating valve back to the mixing vessel may be provided for recirculation of the mix.

In further explanation of the invention, details of specific working examples thereof will now be given aided by reference to the accompanying drawings which are illustrative, somewhat diagrammatically, of plants, operative according to the present improvements and in which FIGURE 1 illustrates one plant and FIGURE 2 another, both in sectional elevation.

EXAMPLE 1

This example concerns the making of confectionery liquorice, the ingredients used being:

|  | Total solids | Moisture |
|---|---|---|
| 300 lbs. Wheat flour_____ 260 lbs. | | 40 lbs. |
| 250 lbs. Sugar (sucrose)_____ 250 lbs. | | 0 lbs. |
| 200 lbs. Molasses (or syrups)_____ 150 lbs. | | 50 lbs. |
| 50 lbs. Liquorice Extract_____ 40 lbs. | | 10 lbs. |
| 800 lbs. ingredients, containing___ 700 lbs. solids and_ | | 100 lbs. moisture which are mixed with |
| 200 lbs. water_____ 0 lb. | | 200 lbs. making |
| 1,000 lbs. liquid mix containing____ 700 lbs. solids and_ | | 300 lbs.=(30%) moisture |

As illustrated by FIGURE 1 of the drawings, the above mix is heated in a steam-jacketed mixing vessel 10, fitted with mixing means 11, to a temperature below the gelatinisation point of the starch in the mix, usually some 60–70° C. (140–160° F.). An outlet 12 at the bottom of the mixing vessel is connected to a pipe line comprising piping 13 leading first to regulating valve 14 and thence to a suitable pump 15 which delivers the liquid mix by means of a rising pipe 16 in the line to the suction side of a vacuum steam jet device 17. This device presents a suction chamber 18 about and towards the steam jet 19 and such chamber is forwardly restricted at 20 beyond and coaxially with the jet to provide in conjunction with a further fitting 21, a venturi formation 20, 21, in the flow line. On the inlet side, the steam jet 19 is connected to a steam supply line 22 provided with a regulating valve 23 and pressure gauge 24. In operation, the valve 23 is opened until the pressure gauge registers about 3 kg./cm.$^2$ (40–45 lbs./square inch). Owing to the construction of the vacuum steam jet device 17 and the velocity with which the steam passes from the jet 19 and through the venturi formation 20, 21, vacuum conditions are created in the suction chamber 18 of the device and the liquid mix flows under the action of the pump 15 and its control valve 14 into the vacuum chamber. This liquid mix becomes almost atomised in such chamber under the vacuum conditions and the solid particles of the mixture become expanded. In this phase the expanded liquid mix travels from the vacuum steam jet device 17 and encounters the blast of steam from the jet 19 substantially at the entry to the venturi formation. The flow line is continued at 25 beyond the venturi formation 20, 21 to provide, with the latter, a region in which the starch granules in particular, having taken part in the general expansion of the solid particles, become instantaneously, and almost completely, gelatinised and the mix takes on a paste-like consistency. The steam temperature may be approximately 275° F.=135° C. For most articles of confectionery to be made from the paste, the degree of gelatinisation of the starch granules is now sufficient. However, in case further and complete gelatinisation is required, the flow line, where extended at 25 beyond the venturi formation, may be a pressure tube wherein, in the paste-like mix passing through in a few seconds, the desired effect is achieved. The pressure tube is suitably fitted with a pressure gauge 26 and thermometer 27 towards its far end. There the paste is released from the pressure tube through a regulating valve 28. By regulating this valve the pressure and corresponding temperature can be adjusted to obtain the desired degree of gelatinisation. Slower flow at higher pressure and temperature produces complete gelatinisation, faster flow at lower pressure and temperature only provides part-gelatinisation. Examples of pressure and temperature at 3.0 kg./cm.$^2$ and 145° C.=293° F. for complete gelatinisation and 2.5 kg./cm.$^2$ and 125° C.=257° F. for 80% gelatinisation.

It is to be noted that as the steam from the steam jet 19 operates on relatively cool slurry material a certain amount of condensation occurs, so that the temperature of the slurry does not rise to the initial steam temperature corresponding to the working pressure but remains below that level. The steam, of course, operates to elevate the temperature of the slurry and good results are obtained with temperatures for example of 102° C.=215° F. to 113° C. =235° F. This procedure avoids excessive heating of the slurry and results in less decomposition of the gelatinised product, preservation of the more heat-sensitive flavours and colours when used in the product and saving of energy and time in the subsequent cooling of the cooked paste or slurry. Certain aromas and colours can therefore be added prior to the cooking of the slurry or paste instead of in a separate operation after the cooking, though either procedure may be adopted if desired.

By the incorporation of live steam into the flowing mix the original moisture content of some 30% is increased to some 32–33%. When the thick paste is released from the pressure tube 25 and enters normal atmospheric conditions, e.g. by way of a flaring discharge duct or tube 29, it gives off moisture in the form of vapour. The final paste may, therefore, only contain some 26–29% moisture.

The discharge duct or tube 29 is shown surrounded by a vapour hood 30 through which the freed and escaping vapour is sucked away by a fan 31. After the paste is released at 29 it passes through the open lower end of the hood 30 and is collected in bins such as 32 in which it may settle and solidify into slabs. These slabs can now be shaped by extrusion or rolling into rods, ribbons, tubes, sheets etc. and be dried in a stream of hot air in customary way until they contain some 15–18% moisture and are ready for packing as the well-known childrens' or other liquorice confectionery lines.

As regards confectionery lines of the above nature, the process of the present invention has the advantage over the conventional batch-method (cooking for 1–7 hours in a jacketed vessel containing ½–1 ton per batch) that it can produce the desired degree of gelatinisation and evaporation of surplus moisture in a fraction of the time (1–2 tons per hour) in a continuous stream under reduced steam pressure (4–8 kg./cm.$^2$ in the batch process), more regularly and completely, with a smaller quantity of initial water. It can be operated by unskilled workers. Wear and tear, and steam and power consumption, are greatly reduced and higher efficiency obtained. In the batch process some 40–50% water are needed to obtain gelatinisation as compared with 30% or less water of the present process, and the surplus has to be evaporated by cooking or drying. In the present invention, moreover the final product possesses a cleaner and sweeter flavour as no decomposition of raw material takes places as it does during the long cooking operation of the batch-process, which often produces an unpleasantly strong to bitter taste. It is generally accepted in the art that products made by the known processes, and completely gelatinised, have a poor eating quality and are of a rubbery texture or "bite." For this reason part-gelatinisation has sometimes been preferred even when it has not given desired surface gloss or lustre. Products made according to the present invention have a good eating quality and, in biting them, one has not to overcome the usual rubbery resistance. Nevertheless, they show superior surface gloss which is not lost (as it is in known cases possiby due to a certain aeration in the cooking process), after a few months of storage.

In addition, other known continuous processes require elaborate and expensive plant, higher steam pressures and more power for moving parts which are exposed to great wear and tear. Skilled operators are needed to run the plants and they do not obtain full gelatinisation.

EXAMPLE 2

This example concerns the production of confectionery fruit jellies or medicated or confectionery pastilles and the like. The ingredients used are:

|  | Total solids | Moisture |
|---|---|---|
| 230 lbs. Sugar (sucrose) | 230 lbs. | 0 lb. |
| 230 lbs. Standard Glucose | 185 lbs. | 45 lbs. |
| 45 lbs. Corn Starch | 45 lbs. | 0 lb. |
| 505 lbs. ingredients containing | 460 lbs. solids and | 45 lbs. moisture which are mixed with |
| 70 lbs. water |  | 70 lbs. making |
| 575 lbs. liquid mix containing | 460 lbs. solids and | 115 lbs.-(20%) moisture |

All these ingredients are mixed and heated to a temperature below gelatinisation point (i.e. 60–70° C.=140–160° F.). Now follows the cooking process which is as described above in connection with Example 1. The final mix which has thickened after cooking and given off moisture to the atmosphere, is less viscous and more fluid when warm than the final mix in Example 1. It can, therefore, continuously be deposited into prepared moulds of dry starch or other-wise after adding the required colouring and flavouring. The mix solidifies on cooling to a solid article, with some 16–18% moisture, within an hour or two and can then be removed from the moulds without having to undergo the conventional drying process. The finished product is of greater clarity and brilliance and better eating quality than those made by the conventional batch-process which is carried out in jacketed cooking pans and takes some 30–45 minutes and produces a dull and non-transparent product. Other known continuous processes also produce articles which lack transparency, and their texture is rubbery. Moreover, in the process of the invention according to this example labour, wear and tear on plant, and steam and power are saved and better articles are produced.

In the same way confectionery or medicated jellies can be made where the gel is not obtained by starch but by gelatine, agar-agar, pectines, gums, and similar substances. The method of production is the same and offers the same advantages as above described.

EXAMPLE 3

This example concerns the extraction of liquorice juice from liquorice root in accordance with the process of the invention.

Figure 2:
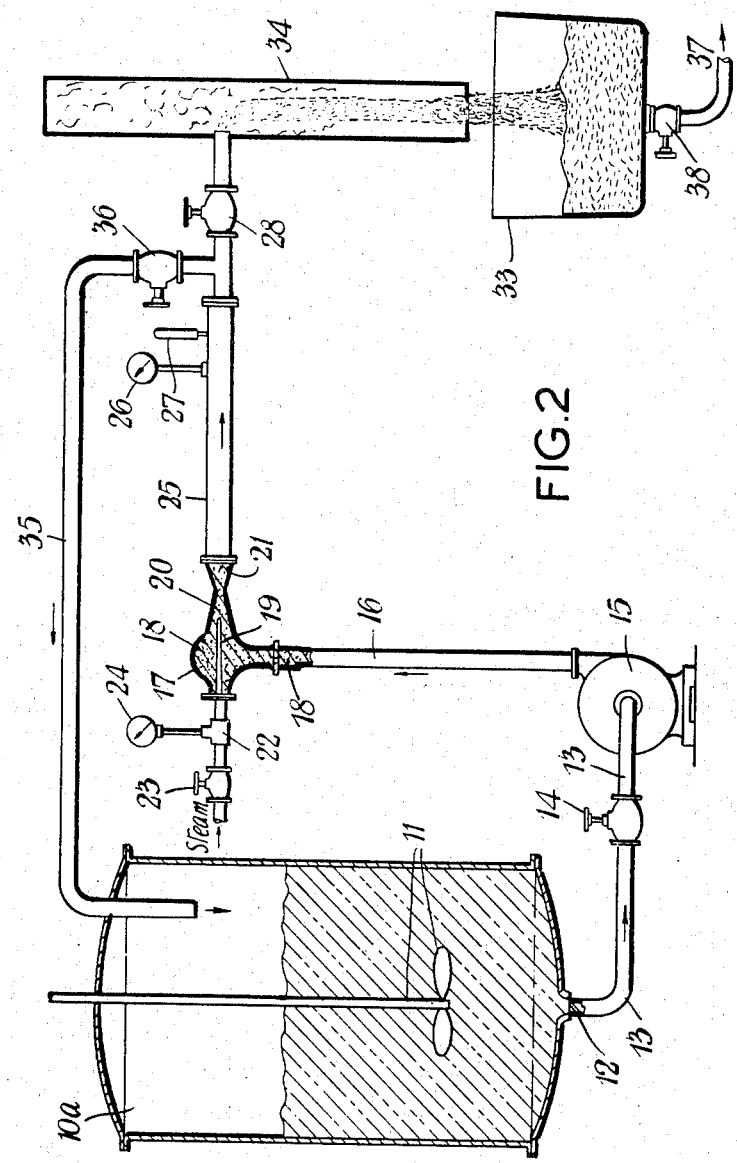

The washed and unpeeled liquorice root is crushed in a mill into pieces, called chips, of some 3–5 mm. (⅛″) in size and some:

500 lbs. of these liquorice root chips are mixed with 1000 lbs. water in a suitable closed extracting vessel such as 10a shown in FIGURE 2 of the drawings.

The 1500 lbs. mixture is now passed through pump 15 and the vacuum-steam jet device 17 in the same way as described in the first two examples. It may be discharged beyond the region 25 and valve 28 into another open vessel 33 by way of an open-ended discharge duct or tube 34 shown disposed at right-angles to the flow line so that the treated mix can discharge at the lower open-end, and vapour can escape from the upper open-end, of the duct or tube 34. However, the mix can, during closure of the valve 28, be recirculated to the first-mentioned closed extracting vessel, according to the degree of extraction which was obtained. For this purpose, as shown in the drawing, a return piping such as 35, with control valve 36, may be used, leading either to the closed vessel 10a or to a similar open vessel wherein it gives off some moisture by natural evaporation. The recirculating process may be continued for ½–1 hour until all extractable matter has been removed from the root, which was, as in the first two examples, expanded in its passage through the vacuum steam jet device 17. During the process the starch contained in the root is also gelatinised under the action of the steam jet and converted into a colloidal solution together with the water. When the root is completely exhausted, the mixture is collected in the open vessel 33. The exhausted root chips are now strained off from vessel 33 as at 37 and past a valve 38 and separated from the "sweet water" which is filtered, evaporated in suitable vacuum evaporators and finally dried to a fine powder or shaped into blocks, the latter containing some 16–18% moisture. In both forms the products are ready for sale to the confectionery, pharmaceutical, tobacco, brewery and other industries.

In the conventional method, 500 lbs. of liquorice root, crushed into larger pieces, would be mixed with some 2500 lbs. water in a closed extractor vessel and the water circulated or percolated through the root chips for some 2–3 hours, sometimes under pressure of 2–3 kg./cm². The same water is then transferred through a second, a third and up to an eighth extractor vessel, each of which contains some more or less exhausted root. Normally, the water flows in counter current to the degree of extraction in the successive vessels. From the last vessel (containing the freshest root) the "sweet water" is removed and the ungelatinised starch filtered out. The ungelatinised starch has to be turned into a colloidal solution by a separate cooking process before it can be combined again with the "sweet water" for further evaporation, drying, powdering or shaping. The whole extraction process may take up to 24 hours.

The process of the present invention has the advantage over this conventional method that it is carried out in a much shorter space of time, with less equipment and steam consumption, that the extraction is more complete and less extractable matter is left in the exhausted root, and that the gelatinisation of the starch contents is carried out in the same extraction operation and no separate gelatinisation process is needed, that less water is needed for the extraction and consequently less water has to be evaporated in the subsequent vacuum-evaporation-process, that the yield is increased and that no decomposition due to long heating process takes place, that it is much more economical and that it does not require pressure in the extractor vessels.

A return piping 35 and valve 36 are shown in both FIGURE 1 and FIGURE 2 of the drawing. Though not essential in FIGURE 1, these parts may be provided and employed therein for re-processing purposes if desired in any particular case. Moreover, the discharge arrangement at 29, 30, 31 in FIGURE 1 and at 34 in FIGURE 2 are interchangeable. For instance, that in FIGURE 1 is more particularly intended for dealing with thick pastes, whilst that in FIGURE 2 would be suitable also where medium and lighter pastes are concerned.

I claim:

1. A continuous process for cooking gelatinous, gelatinizable fibrous and similar substances which contain material selected from the group consisting of starch and other extractable gel-forming matter, comprising:
   (a) mixing such material with a minimum of liquid in a mixing zone to thereby obtain a flowable mixture,
   (b) continuously withdrawing the mixture thus obtained from the mixing zone and passing it through a pumping zone so as to cause linear flow,
   (c) delivering said flowable mixture to a first zone downstream of said pumping zone wherein the cross sectional area of the flowing stream is substantially increased,
   (d) maintaining a pressure in said first zone which is lower than the pressure upstream of said first zone,
   (e) allowing the particles of said material to expand and swell in said first zone under the influence of the reduced pressure conditions maintained in said first zone,
   (f) contacting the expanded particles of said material leaving said first zone with a stream of hot, gaseous medium in a second zone that is downstream of said first zone so as to gelatinize or extract said swollen and expanded particles, and
   (g) subsequently discharging the resultant product downstream of said second zone.

References Cited

UNITED STATES PATENTS

| | | | |
|---|---|---|---|
| 1,243,251 | 10/1917 | Bue et al. | 99—134 |
| 2,200,192 | 5/1940 | Sipe | 99—443 |
| 2,726,960 | 12/1955 | Bolanowski | 99—134 |
| 3,038,809 | 6/1963 | Fitzmaurice et al. | 99—134 |
| 2,678,276 | 5/1954 | North | 99—134 |
| 2,805,966 | 9/1957 | Etheridge | 127—32 |
| 2,941,889 | 6/1960 | Welch | 99—186 |
| 3,192,047 | 6/1965 | Moyle et al. | 99—7 |
| 3,133,836 | 5/1964 | Winfrey et al. | 127—71 |

FOREIGN PATENTS 883,440   11/1961   Great Britain.

A. LOUIS MONACELL, Primary Examiner.

HYMAN LORD, RAYMOND N. JONES, Examiners.

S. E. HEYMAN, J. M. GOLIAN, Assistant Examiners.